UNITED STATES PATENT OFFICE.

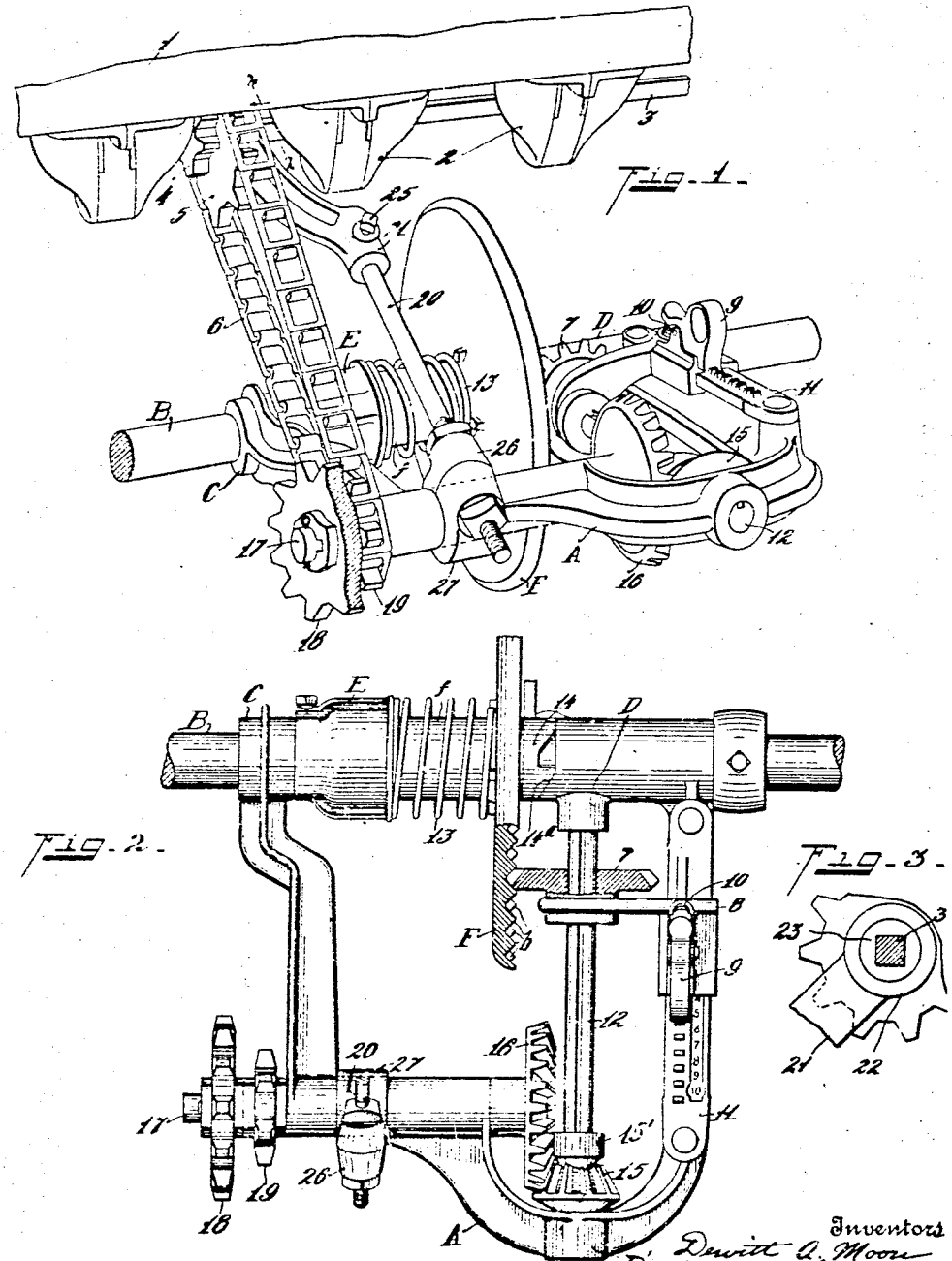

DEWITT A. MOON, OF LOUISVILLE, KENTUCKY, AND EDWARD CHRISTMAN, OF RICHMOND, INDIANA, ASSIGNORS TO THE AMERICAN SEEDING MACHINE COMPANY, OF SPRINGFIELD, OHIO, A CORPORATION OF OHIO.

SEEDING-MACHINE GEARING.

964,802.  Specification of Letters Patent.  Patented July 19, 1910.

Application filed January 10, 1910. Serial No. 537,179.

*To all whom it may concern:*

Be it known that we, DEWITT A. MOON, a citizen of the United States, residing at Louisville, in the county of Jefferson, State of Kentucky, and EDWARD CHRISTMAN, a citizen of the United States, residing at Richmond, in the county of Wayne and State of Indiana, have invented certain new and useful Improvements in Seeding-Machine Gearing, of which the following is a specification.

Our invention relates to improvements in seeding machines, preferably to that type employing means for driving the feed shaft at variable speeds.

The object of our invention is to provide an attachment for seeding machines, comprising a frame on which is mounted variable speed gearing for imparting different speeds to the seed feeding mechanism.

The features of our invention are more fully set forth in the description of the accompanying drawings, forming a part of this specification, in which:—

Figure 1 is a perspective view of the changeable gear system of a seeding machine containing our improvements. Fig. 2 is a top plan view of said mechanism. Fig. 3 is a detailed view on line $x, x$, Fig. 1.

Referring to the figures, 1 represents the seed box of a seeding machine; 2 the individual feed cups in which are mounted rotating feed wheels of ordinary construction operated by a rotative rod 3, which is preferably square, which rod is journaled in the customary manner and fits in square openings in the series of seed wheels. 4 and 5 represent sprocket wheels of different diameter mounted on the feed shaft 3, which are selectively driven by a sprocket chain 6.

B represents the ordinary driving shaft which is usually the axle of the ground wheels on which the main frame is supported.

A represents the frame on which is mounted the variable speed mechanism. In the preferred form of construction it is of U-shape, the projecting arms of which are provided with sleeve journals C, D, hinged upon the driving axle B.

Upon the frame A is mounted a train of transmitting gears forming a part of the variable speed mechanism, being driven by the following devices mounted on the shaft B.

E represents a collar secured to shaft B.

F represents the primary transmitting gear slidably mounted on shaft B. The gear F has a sleeve hub extending laterally and splined to the collar E in the usual manner. Such primary gear is provided with a plural series of concentric driving gear teeth $b$ annularly arranged upon the face of the disk from any one of which motion is primarily transmitted through the system of change gears to the feed wheel shaft.

7 represents a bevel gear mounted on shaft 12 and meshing with any one of the series of driving gear teeth of gear F. One end of said shaft is journaled in frame A at D and the other end at D'. Gear 7 is splined upon said shaft and longitudinally adjustable thereon, by the following instrumentalities:—8 represents an arm connected to the hub of gear 7, and extends laterally over the elevated arm 11 of the frame. 9 represents a pawl pivoted to said arm, the free end of which engages selectively with any one of the series of teeth formed on said arm 11 opposite a numerical index.

10 represents a spring for normally holding the pawl in engagement with any one of said teeth. As the pawl is brought into engagement with any one of the series of said teeth it locks the sliding gear in its selected position. To allow a ready change of gear engagement, we provide the following devices:—Gear F is slidable on the axis B, but held in engagement with the gear 7 by means of spring 13, which is sufficiently strong to maintain driving engagement of said gears. When it is desired to shift the gear 7, the spring must be compressed. To accomplish this, we provide the cam collar 14, provided with a cam face 14$^a$, adapted to engage with the cam face on sleeve D, when said cam is turned to compress the spring. This frees the engagement of the gear wheels and allows the gear 7 to be moved laterally on shaft 18 when it is fixed in the desired position by the pawl 9.

15 represents a beveled gear on shaft 12, meshing with gear 16 on a transmitting shaft 17. 15' is a collar preferably secured to the shaft by a set screw, which holds pinion 15 in proper relation to bevel wheel 16. On said shaft 17 are shown two differently sized sprocket gears 18, 19, one of which is selectively used to transmit motion by means of a sprocket chain 6 to the feed shaft 3.

The frame A is hinged to the axle B and is suspended at an angle to the feed shaft 3 by means of a tie-bar 20. This tie-bar is made of two sections adjustably connected together. 21 represents the forward end of said sectional bar, which is provided with a boss 22, in which is journaled the hub 23 of sprocket gear 5, which hub is provided with a square orifice fitting shaft 3, so as to allow the tie-bar to turn on the hub of the sprocket wheel when said tie-bar is adjusted. The forward end of the tie-bar 20 is rigidly connected to the sleeve of the front section by a set screw 25. The rear end of said tie-bar projects through a boss 26, formed on sleeve 27, supported upon the frame A. Said tie-bar suspends the frame A and its contained parts upon the axle B, at an angle to the rod 3 of the feed devices. This change of angle is accomplished by lengthening or shortening the tie-bar to the desired angle of adjustment.

It will thus be seen that we employ two independent systems of change gears. The primary variation of speed is accomplished by changing the position of spur-gear 7, relative to the primary transmitter F, without changing the angle of inclination of the frame. The second change of speeds is effected by loosening the rod 20 so as to swing the frame to change the distance between shaft 17 and shaft 3, then shifting the sprocket chain from the wheels 5, 19 to the sprocket wheels 4, 18, and tightening the rod 20 to secure this new adjustment. Each of the speed changes effective through the variable gear mechanism on the hinged frame will then have a new feed value by reason of the different ratios of the sprocket wheels 4, 18, as compared to the ratio of the wheels 5, 19. Thus a very large range of speed changes may be obtained employing the bracket frame and its train of gears as the primary system of transmission and multiplying the same by the secondary system of transmission.

By means of the tie-bar 20, the tautness of the sprocket chain can be regulated at will.

While the drawings show the frame A projected rearwardly from the axle B, it is obvious that it can be projected toward the front of the implement. This mechanism can be readily attached to any type of seeding machine, regardless of the variations of the distance between the driving axle and the feed rod of any of said different types of implements.

While we have shown the journals C, D, as being plain sleeves, it is obvious that they may be of the split-sleeve construction thereby permitting the frame and its contained mechanism to be removed from the axle without stripping said shaft.

The attachment frame is of yoke or U-form in the general plan and the transmission gears are mounted upon shafts journaled directly to and between the arms of said frame, so that the frame itself is of brace form and firmly holds the said parts in working position, as well as allowing the said frame and its contained gears to be attached to or moved bodily from the seeding machine.

Having described our invention, we claim:—

1. In a seeding machine, a driving shaft and wheel, a driven shaft and wheel, a frame radially extended from the driving shaft and angularly adjustable relative thereto, variable speed devices on said frame in train with said driving and driven wheels, and means for transmitting motion from the variable speed devices on the frame to the driven wheel in the different positions of adjustment of the frame.

2. In a seeding machine, a driving shaft and wheel, a driven shaft, two different diameter wheels thereon, a frame hinged on the driving shaft and movable toward and from the driven shaft, a transmitting shaft in the outer end of the frame, two different diameter wheels on the transmitting shaft disposed in the respective planes of the wheels on the driven shaft, means for adjusting said frame, a variable speed gear mechanism on said frame connecting the driving wheel with the transmitting shaft in any position of adjustment of the frame, and an endless chain connecting a driven wheel with a wheel on the transmitting shaft.

3. In a seeding machine, a driving shaft and wheel, a driven shaft, two different diameter wheels thereon, a frame hinged to one of said shafts and adjustable toward and from the other, a transmitting shaft on said frame, two wheels thereon in the respective planes of the driven wheels, an endless transmitter, a variable speed mechanism on the frame connecting the driving shaft wheel with the transmitting shaft, and means for securing said frame in its position of adjustment.

4. In a seeding machine, a driving shaft and wheel, a driven shaft, two different diameter wheels thereon, a frame hinged on one of said shafts and movable toward and from the other, a longitudinally adjustable rod for securing the frame in its adjustment, a transmitting shaft on the frame, two wheels thereon disposed opposite to the driven wheels, an endless transmitter, and variable speed mechanism on the frame connecting the driving shaft with the transmitting shaft.

5. In a seeding machine, a driving and a driven shaft, a swinging frame, a transmitting shaft in the frame, means for adjusting the frame, a variable speed mechanism on the frame connecting one of said shafts with the transmitting shaft, and an independent variable speed mechanism connected to the transmitting shaft and the other shaft, and adapted to be changed in the varying positions of adjustment of the frame.

6. In a seeding machine, a driving shaft and wheel, a driven shaft, two different diameter wheels thereon, a frame adjustably hinged to the driving shaft, a transmitting shaft in said frame, two wheels thereon disposed opposite the driven wheels, transmission mechanism on the frame between the driving wheel and transmitting shaft, adapted to maintain them in operative connection when the frame is moved, and an endless transmitter between a wheel of the driven and a wheel of the transmission shaft.

7. In a seeding machine, a driving shaft and wheel, a driven shaft, two different diameter wheels thereon, a frame adjustably hinged to the driving shaft, a transmitting shaft in the frame, two wheels thereon disposed opposite to the driven wheels, an endless transmitter connecting a wheel of the driven shaft with a wheel of the transmission shaft, and variable speed mechanism on the frame extending radially relative to the driving shaft and in train with the driving wheel for rotating the transmission shaft in any position of adjustment of the frame.

8. In a seeding machine, a driving shaft, a speed variating driving disk therefor, a driven shaft, two different diameter wheels thereon, a frame adjustably hinged to the driving shaft, a transmission shaft in the frame movable thereby toward and from the driven shaft, two wheels on the transmission shaft opposite the driven wheels, an endless transmitter connecting two of said wheels, and variable speed mechanism on the frame extending radially toward the driving shaft, and having a rotary member radially adjustable for engagement with different diameter surfaces of the speed variating disk.

9. In a seeding machine, a driving and a driven shaft, a frame hinged to one of said shafts, a transmission shaft in the frame, transmission mechanism between the transmission shaft and one of said shafts adapted to be shifted to give two changes of speed as the frame is set, and variable speed mechanism between the transmission shaft and the third shaft.

10. In a seeding machine, a driving and a driven shaft, a driving and a driven wheel therefor, a frame on one of said shafts, an intermediate wheel on said frame, variable speed mechanism between said driving shaft wheel and said intermediate wheel, and a motion transmitting device connecting said intermediate and driven wheels.

In testimony whereof, we have hereunto set our hands.

DEWITT A. MOON.
EDWARD CHRISTMAN.

Witnesses as to signature of Dewitt A. Moon:
NINA L. PILSON,
HENRY J. TILFORD.

Witnesses as to signature of Edward Christman:
W. B. CARR,
C. H. BAKER.